(12) United States Patent
Mann et al.

(10) Patent No.: US 8,523,216 B2
(45) Date of Patent: Sep. 3, 2013

(54) FIFTH WHEEL SLIDE RAIL

(75) Inventors: Steven W Mann, Gardendale, AL (US); James M. Rhodes, Pelham, AL (US)

(73) Assignee: Fontaine Fifth Wheel Company, Trussville, AL (US)

( * ) Notice: Subject to any disclaimer, the term of this patent is extended or adjusted under 35 U.S.C. 154(b) by 324 days.

(21) Appl. No.: 12/826,793

(22) Filed: Jun. 30, 2010

(65) Prior Publication Data

US 2012/0001404 A1   Jan. 5, 2012

(51) Int. Cl.
*B62D 53/08* (2006.01)

(52) U.S. Cl.
USPC ............... 280/438.1; 280/433; 280/441.1; 238/29

(58) Field of Classification Search
USPC ............... 280/438.1, 433, 441.1, 441, 901; 238/29
See application file for complete search history.

(56) References Cited

U.S. PATENT DOCUMENTS 7,114,740 B1 * 10/2006 Mann et al. ............... 280/438.1

* cited by examiner

*Primary Examiner* — Tony Winner
*Assistant Examiner* — Jacob Knutson
(74) *Attorney, Agent, or Firm* — R. Blake Johnston, Esq.; DLA Piper LLP US

(57) ABSTRACT

An improved slide rail for a fifth wheel hitch assembly is disclosed that has T-shaped cross-section with a horizontal top section and a vertical base section. The horizontal top section includes scalloped edges, and the vertical base section includes weld pockets.

11 Claims, 4 Drawing Sheets

FIFTH WHEEL SLIDE RAIL

BRIEF DESCRIPTION OF THE DRAWINGS

The present disclosure is described with reference to the accompanying drawings. In the drawings, like reference numbers indicate identical or functionally similar elements.

DETAILED DESCRIPTION

The various embodiments of the present disclosure and their advantages are best understood by referring to FIGS. 1 through 6 of the drawings. The elements of the drawings are not necessarily to scale, emphasis instead being placed upon clearly illustrating the principles of the disclosure. Throughout the drawings, like numerals are used for like and corresponding parts of the various drawings.

The drawings represent and illustrate examples of the various embodiments of the disclosure, and not a limitation thereof. It will be apparent to those skilled in the art that various modifications and variations can be made in the present embodiments without departing from the scope and spirit of the disclosure as described herein. For instance, features illustrated or described as part of one embodiment can be included in another embodiment to yield a still further embodiment. Moreover, variations in selection of materials and/or characteristics may be practiced to satisfy particular desired user criteria. Thus, it is intended that the present disclosure covers such modifications as come within the scope of the features and their equivalents.

Furthermore, reference in the specification to "an embodiment," "one embodiment," "various embodiments," or any variant thereof means that a particular feature or aspect of the disclosure described in conjunction with the particular embodiment is included in at least one embodiment of the present disclosure. Thus, the appearance of the phrases "in one embodiment," "in another embodiment," or variations thereof in various places throughout the specification are not necessarily all referring to its respective embodiment.

Terms such as "aft," "rear," "forward," "front," "lateral," "inboard" or "outboard," or the like, and variations or derivatives thereof, are to be understood in relation to the vehicle on which the fifth wheel is mounted. However, it is to be understood that the disclosure may assume various alternative orientations, except where expressly specified to the contrary. It is also to be understood that the specific devices and processes illustrated in the attached drawings and described in the following specification are exemplary embodiments of the inventive concepts defined in the appended claims. Hence, specific dimensions and other physical characteristics relating to the embodiments disclosed herein are not to be considered as limiting, unless the claims expressly state otherwise.

Figure 1A:
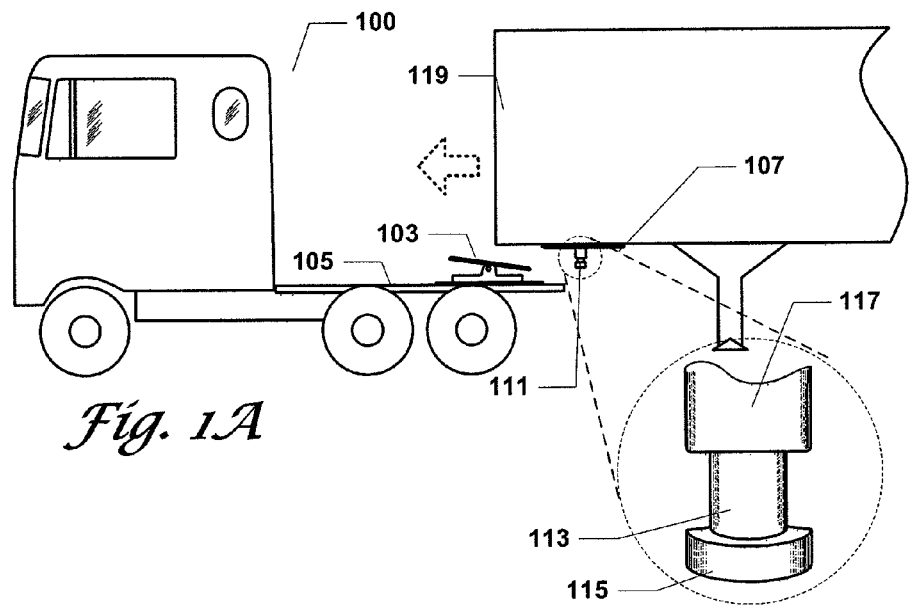
FIG. 1A is an exemplary tractor truck and trailer with a fifth wheel hitch.
Figure 1B:
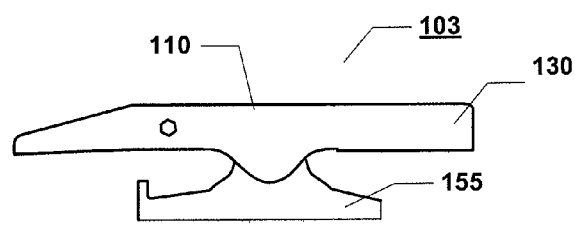
FIG. 1B is an exemplary fifth wheel hitch.
Figure 1C:
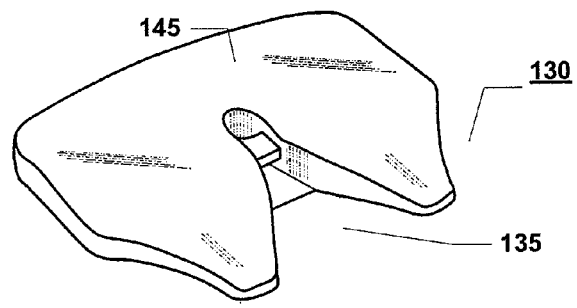
FIG. 1C is an exemplary hitch plate.

Referring to the Figures, fifth wheel hitches are well known in the field of towing trailers using a truck or tractor. FIGS. 1A through 1C depict an exemplary tractor and trailer hitch arrangement employing a fifth wheel hitch. Tractor 100 is affixed with a fifth wheel hitch 103 positioned rearward on the tractor frame 105. Fifth wheel hitch 103 includes a fifth wheel hitch assembly 110 pivotally mounted on slide assembly 155. Fifth wheel hitch assembly 110 comprises hitch plate 130 which houses a locking mechanism underneath with slot 135 opening toward the aft end of fifth wheel assembly 110 for receiving a kingpin 111 from trailer 119.

Kingpin 111 typically extends downward from a trailer bearing plate 107, which rests upon fifth wheel assembly, specifically, upon load area 145 of fifth wheel hitch plate 130. Kingpin is, typically, a unitarily constructed article comprised of a lower flange 115 capping a shank 113 which extends from collar 117.

Figure 1D:
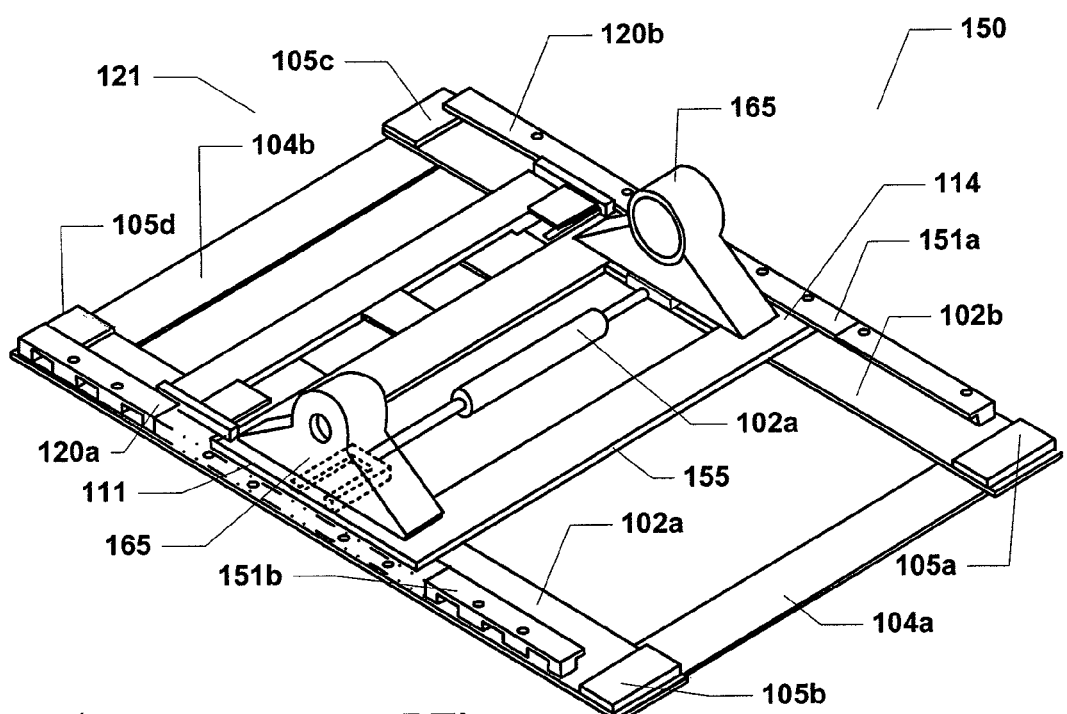
FIG. 1D is an exemplary prior art fifth wheel slide rail assembly.

FIG. 1D depicts an example of the prior art slide rail where slide rail assembly 120a is comprised of left and right slide rail plates 102a, b tied in parallel by two or more tie bars 104a, b which form slide frame 121. Left slide rail 151b is attached to the upper surface of left slide rail plate 102a and right slide rail 151a is attached to upper surface of right slide rail plate 102b such that fifth wheel hitch assembly 110 and slide assembly 155 are located therebetween, inboard of the left and right slide rails 102a, b. Slide rail plates 102a, b and slide rails 151a, b each have longitudinal axes which parallel the longitudinal axis of tractor 109 and are typically mounted, either with welding or fastening, to parallel longitudinal truck frame members (not shown), usually with using interposing angle iron members.

Slide stop blocks 105a-d are located at each end of each slide rail plate 102a, b. Slide stop blocks 105a-d prevent over travel of slide assembly 155. As is shown in the illustration, slide rails 151a, b of the prior art are typically a flange extending inboard of the assembly, slidably receiving laterally extending flanges 111, 114 of slide assembly 155. Slide rails 151a, b typically include gaps, or detents, 176 spaced along the length of the slide rail.

The slide assembly 155 may include a means for selectively locking the bracket in position longitudinally with respect to the slide rail assembly. One example, shown in FIG. 1D, is a pneumatic cylinder 177 mounted in the assembly from which laterally extend plunger arms 173a, b. A fork member 179 may be mounted to the respective lateral ends of plunger arms 173, where the fork member includes projections, or prongs, 181 that insert into the slide rail gaps 176 when the plungers arms are extended. The engagement of the projections 181 into the gaps 176, thus, prevents longitudinal movement of the slide assembly 155, and, therefore, the fifth wheel assembly. Slide assembly 155 also comprises brackets 165 which provide attachment support for the hitch assembly 110, configured to allow the hitch assembly to pivot in the longitudinal plane.

Figure 2:
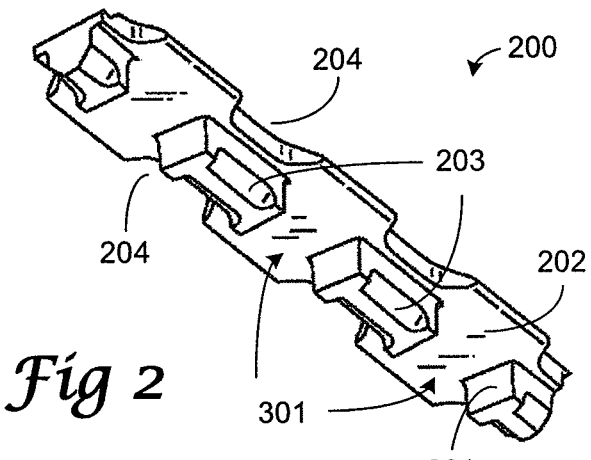
FIG. 2 depicts a bottom perspective view of an exemplary slide rail according to an aspect of the present disclosure.

As shown in FIG. 2, an exemplary slide rail 200 embodying the principle of the present disclosure is defined by a generally vertical base section 201 and a horizontal top section 202. The base section 201 includes weld pockets 203 which extend inwardly from the sides of the base section 201 at the bottom of the base section 201. The horizontal top section 202 is characterized by a rounded top 205 (FIG. 3B) and inward and outward scalloped edges 204 which allow a welding gun (not shown) to easily access the weld pockets 203 during the manufacturing process. Slide rail gaps 301 are spaced along the length of the base section 201 and abut the bottom surface of the horizontal top section 202 between successive pairs of scalloped edges 204. The slide rail gaps 301 are a series of spaced-apart gaps positioned at longitudinal intervals of the base section 201, and are formed by the bottom surface of the horizontal top section 202 and opposing parallel vertical surfaces of the base section 201. The rounded top 205, scalloped edges 204, weld pockets 203, and slide rail gaps 301 allow for the overall height and weight of the slide rail 200 to be reduced, thus reducing the cost.

Figure 3B:
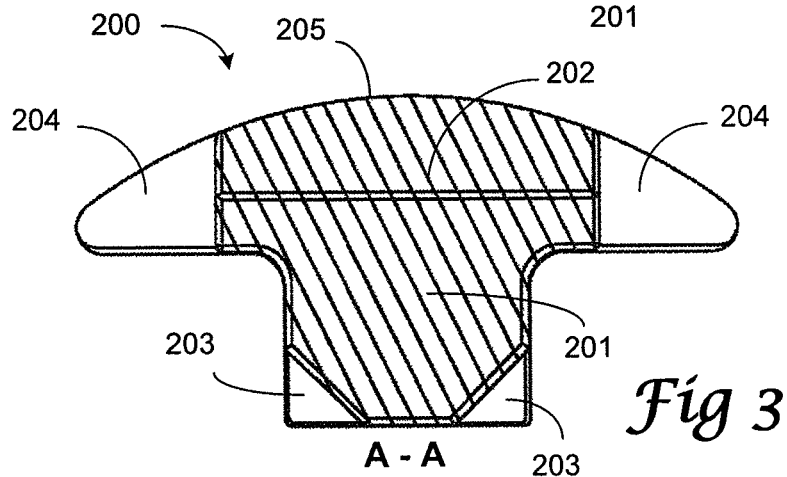
FIG. 3B is a section view of the slide rail of FIG. 2 along line A-A.
Figure 3A:
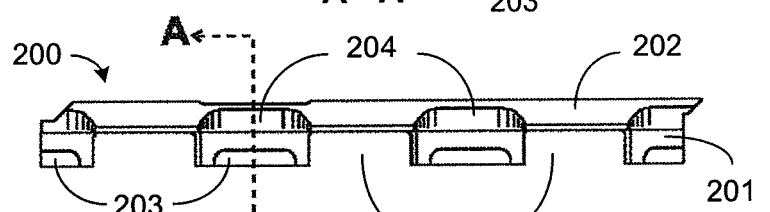
FIG. 3A depicts a side view of the slide rail of FIG. 2.

FIG. 3A depicts a side view of the exemplary slide rail 200 of FIG. 2. The base section 201 is defined by a series of slide rail gaps 301 which receive prongs of a slide assembly (FIG. 6) which supports a fifth wheel hitch assembly 110 (FIG. 1A). The slide rail gaps 301 of the present disclosure have been increased in size from those in prior designs, resulting in the use of less material and further reducing the weight and height of the slide rail 200. The weld pockets 203 are located between consecutive slide rail gaps 301 at the bottom of the base section 201 and are vertically aligned with the scalloped edges 204 of the horizontal top section 202.

FIG. 3B depicts a cross-sectional view of the exemplary slide rail 200 of FIG. 3A. The slide rail 200 has a generally T-shaped cross-section defined by a generally vertical base section 201 having a plurality of weld pockets 203 extending inwardly from the sides of the base section 201, and a horizontal top section 202 characterized by a rounded top 205 and inward and outward scalloped edges 204. The weld pockets 203 and scalloped edges 204 simplify the manufacturing process while also reducing the overall weight of the slide rail.

Figure 4:
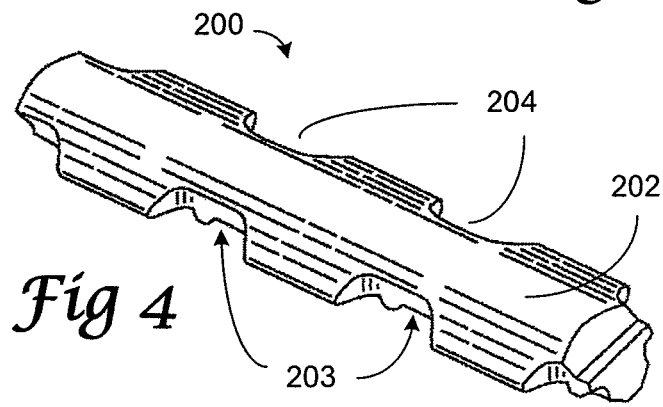
FIG. 4 depicts a top perspective view of the slide rail of FIG. 2.

FIG. 4 depicts a top perspective view of the slide rail 200 of FIG. 2. As shown in FIG. 4, in one embodiment the scalloped edges 204 on both the inward and outward sides of the horizontal top section 202 are vertically aligned with the weld pockets 203. This configuration is desirable because it simplifies the manufacturing process while reducing the overall cost of the slide rail 200.

Figure 5:
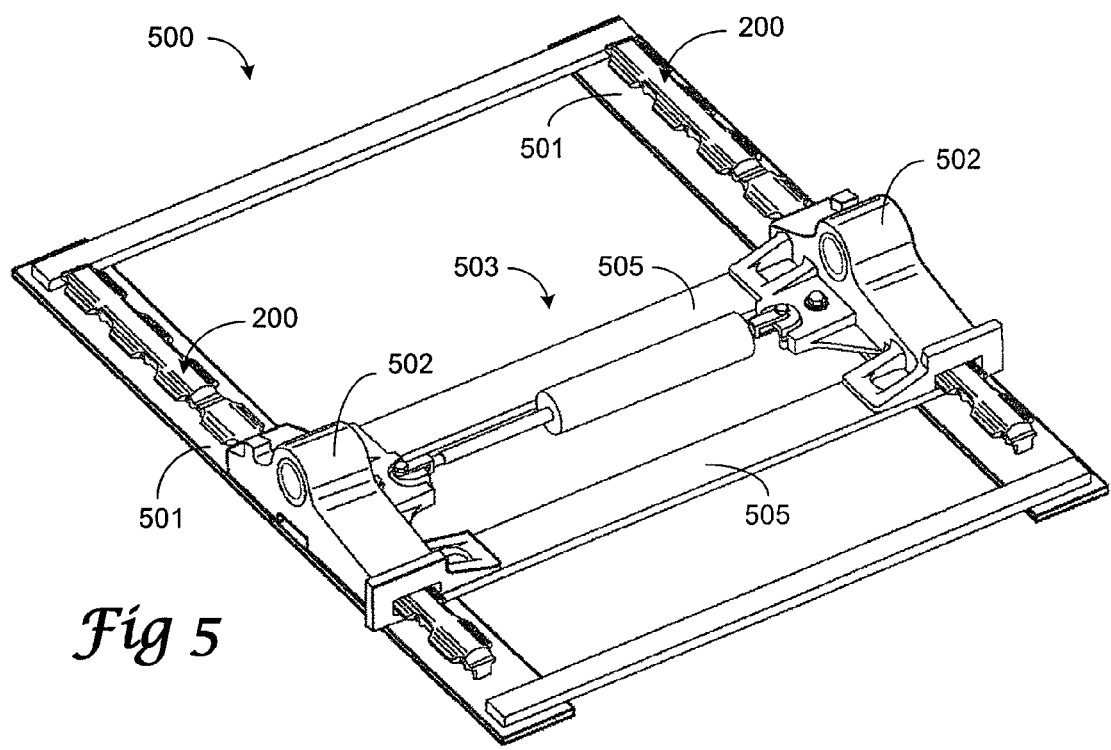
FIG. 5 depicts a top perspective view of exemplary slide rails utilized in a fifth wheel slide rail assembly.
Figure 6:
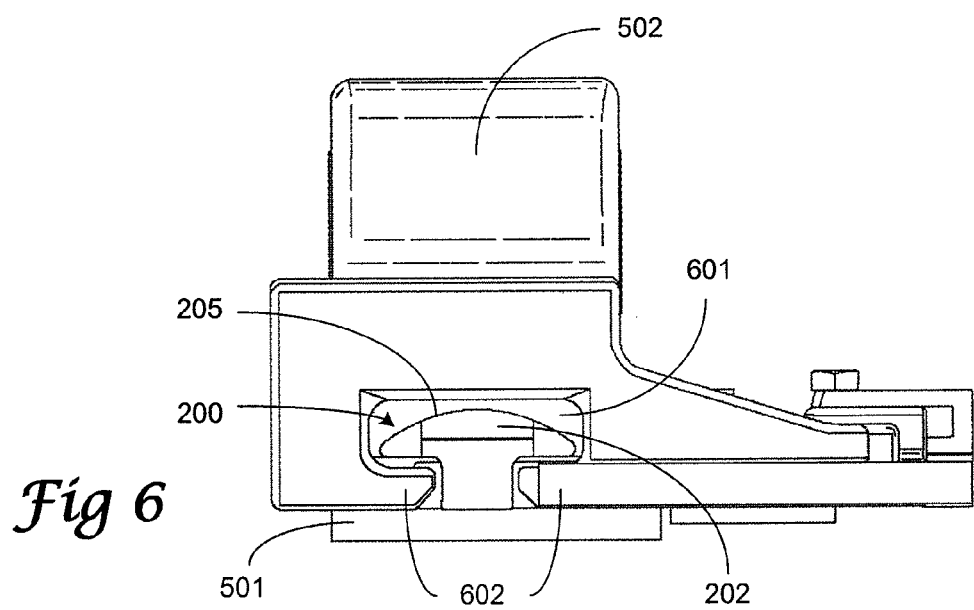
FIG. 6 depicts an illustrative end-on view of the slide rail utilized in conjunction with a bracket.

FIG. 5 depicts exemplary slide rails 200 embodying the principles of the present disclosure utilized in a fifth wheel slide rail assembly 500. The slide rails 200 are mounted in parallel to parallel slide rail plates 501 and run longitudinally with respect to the tractor 100 (FIG. 1A). Sliding pedestal assembly 503 comprises two sliding brackets 502 tied in parallel by tie bars 505. With reference to FIG. 6, the slide rail 200 fits within a longitudinal channel 601 defined within the bracket 502. A similar bracket is described in the co-owned and co-pending U.S. application Ser. No. 12/466,245, which is incorporated by reference herein. Flanges 602 of the bracket 502 slidably engage the slide rail 200 below the horizontal top section 202 and above the top of the slide rail plate 501. The rounded top 205 of the horizontal top section 202 provides more room in the channel 601 than previous embodiments, allowing for easier adjustment of the bracket 502 while saving material and reducing cost. The sliding pedestal assembly 503 is engaged with the slide rails 200 through brackets 502 which allow the sliding pedestal assembly 503 to be locked onto the slide rails. The sliding pedestal assembly 503 can be slid longitudinally along the slide rails 200 to adjust its position. The reduction in height of the slide rail 200 of the present disclosure allows a reduction in cost of the fifth wheel slide rail assembly 500 while still allowing enough room for a sliding pedestal assembly 503 to be slidably adjusted along the slide rails 200.

It will be appreciated that the slide rail described above offers several advantages over the prior art in fifth wheel assembly slide rails. It reduces manufacturing costs by eliminating materials, namely with the rounded horizontal top section, the reduced height, and the larger slide rail gaps. Furthermore, welding during the manufacturing process has been made easier by the weld pockets, which increase the surface area of the slide rail that is welded to the truck frame and create stronger joints, and the scalloped edges, which allow easier access to the weld pockets during welding. All of these advantages have been incorporated without sacrificing any functionality associated with the prior art.

As described above and shown in the associated drawings, the present disclosure comprises a fifth wheel slide rail. While particular embodiments of the disclosure have been described, it will be understood, however, that the disclosure is not limited thereto, since modifications may be made by those skilled in the art, particularly in light of the foregoing teachings. It is, therefore, contemplated by the following claims to cover any such modifications that incorporate those features or those improvements that embody the spirit and scope of the present disclosure.

What is claimed is:

1. A slide rail for a longitudinally adjustable fifth wheel hitch, said slide rail having a generally T-shaped cross-section comprising;
   a. a vertical base section including inboard and outboard sides and having one or more weld pockets;
   b. a horizontal top section including inboard and outboard sides and having one or more scalloped edges;
   c. wherein said scalloped edges are located on the inboard and outboard sides of said horizontal to section, and said weld pockets are located on the inboard and outboard sides of said vertical base section; and
   d. wherein each said scalloped edge is vertically aligned with one said weld pocket.

2. The slide rail of claim 1, wherein said horizontal top section further comprises a rounded top surface.

3. The slide rail of claim 2, further comprising a plurality of slide rail gaps located at longitudinal intervals of said vertical base section.

4. A slide rail assembly for a longitudinally adjustable fifth wheel hitch, said slide rail assembly configured for mounting to a truck frame, said slide rail assembly comprising:
   a. left and right slide rail plates, said slide rail plates mounted in parallel to said truck frame; and
   b. left and right slide rails, said slide rails mounted in parallel to said slide rail plates, each said slide rail having a generally T-shaped cross-section with a horizontal top section including inboard and outboard sides and a vertical base section including inboard and outboard sides, each said horizontal top section having a plurality of scalloped edges located on the inboard and outboard sides of the horizontal top section, and each said vertical base section having a plurality of weld pockets located on the inboard and outboard sides of the vertical base section.

5. The slide rail assembly of claim 4, wherein each said horizontal top section of said slide rail further comprises a rounded top.

6. The slide rail assembly of claim 5, wherein each said vertical base section of said slide rail further comprises a plurality of slide rail gaps.

7. A vehicle having a longitudinally adjustable fifth wheel hitch, said vehicle comprising:
   a. left and right slide rails, said slide rails mounted in parallel to said vehicle, each said slide rail having a T-shaped cross-section with a horizontal top section having inboard and outboard sides and a vertical base section having inboard and outboard sides, each said horizontal to section having a plurality of scalloped edges located on the inboard and outboard sides, and each said vertical base section having a plurality of weld pockets located on the inboard and outboard sides.

8. The vehicle of claim 7, wherein each said horizontal top section further comprises a rounded top.

9. The vehicle of claim 8, wherein each said vertical base section further comprises a plurality of slide rail gaps.

10. The vehicle of claim 7, further comprising a truck frame, wherein said left slide rail and said right slide rail are mounted to said truck frame.

11. The vehicle of claim 10, further comprising left and right slide rail plates, wherein said left slide rail plate and said right slide rail plate are mounted on said truck frame, said left slide rail is mounted on said left slide rail plate, and said right slide rail is mounted on said right slide rail plate.

* * * * *